(12) United States Patent
Yang et al.

(10) Patent No.: US 12,347,188 B2
(45) Date of Patent: Jul. 1, 2025

(54) FLIGHT MISSION LEARNING USING SYNTHETIC THREE-DIMENSIONAL (3D) MODELING AND SIMULATION

(71) Applicant: The Boeing Company, Chicago, IL (US)

(72) Inventors: Yan Yang, Brisbane (AU); Anthony Mountford, Brisbane (AU); Jamieson Lee, Brisbane (AU)

(73) Assignee: The Boeing Company, Arlington, VA (US)

(*) Notice: Subject to any disclaimer, the term of this patent is extended or adjusted under 35 U.S.C. 154(b) by 501 days.

(21) Appl. No.: 17/517,594

(22) Filed: Nov. 2, 2021

(65) Prior Publication Data

US 2022/0237908 A1 Jul. 28, 2022

Related U.S. Application Data

(60) Provisional application No. 63/125,368, filed on Dec. 14, 2020.

(51) Int. Cl.
*G06V 20/17* (2022.01)
*G06T 17/10* (2006.01)
(Continued)

(52) U.S. Cl.
CPC .............. *G06V 20/17* (2022.01); *G06T 17/10* (2013.01); *G06V 20/35* (2022.01); *G06V 20/52* (2022.01); *G08G 5/30* (2025.01); *B64U 2101/30* (2023.01)

(58) Field of Classification Search
None
See application file for complete search history.

(56) References Cited

U.S. PATENT DOCUMENTS 8,396,328 B2 * 3/2013 Sandrew .............. H04N 13/266
358/518
10,593,066 B1 * 3/2020 Dhua ........................ G06T 7/70
(Continued)

OTHER PUBLICATIONS

Diston, D. J. (2009). Computational Modelling and Simulation of Aircraft and the Environment: vol. 1; Platform Kinematics and Synthetic Environment (1. Aufl.). Wiley. (Introduction, pp. 1-23) (Year: 2009).*
Kristan, Michael J et al. "Cursor-on-Target Message Router User's Guide." (2009). (Section 2) (Year: 2009).*
M. Liu, K. Zhang, J. Zhu, J. Wang, J. Guo and Y. Guo, "Data-Driven Indoor Scene Modeling from a Single Color Image with Iterative Object Segmentation and Model Retrieval," in IEEE Transactions on Visualization and Computer Graphics, vol. 26, No. 4, pp. 1702-1715, Apr. 1, 2020 (Year: 2020).*
(Continued)

*Primary Examiner* — Amandeep Saini
*Assistant Examiner* — Caroline Tabancay Duffy
(74) *Attorney, Agent, or Firm* — Harrity & Harrity, LLP

(57) ABSTRACT

An apparatus for labeling an object includes a processor and a memory. The processor creates a synthetic three-dimensional (3D) modeling environment scene, generates image data synthetically generated by an in-flight camera simulation, the image data being within the 3D modeling environment scene based on an orientation of a camera and including one or more objects; uses a mask to identify the one or more objects in the 3D modeling environment scene, labels the identified one or more objects using a cursor on target (COT) lookup table, and stores the labeled identified one or more objects and flight metadata in a database as part of a training dataset to thereby train an artificial intelligence (AI) system. The AI system identifies a real object corresponding to the label of the one or more identified one or more objects in the COT lookup table. The real object is a real-world, target object.

32 Claims, 10 Drawing Sheets

(51) Int. Cl.
*G06V 20/00* (2022.01)
*G06V 20/52* (2022.01)
*G08G 5/30* (2025.01)
*B64U 101/30* (2023.01)

(56) References Cited

U.S. PATENT DOCUMENTS

| | | | | |
|---|---|---|---|---|
| 10,719,939 | B2* | 7/2020 | Holzer | H04N 13/243 |
| 11,334,762 | B1* | 5/2022 | Wrenninge | G06V 10/774 |
| 11,869,236 | B1* | 1/2024 | Callari | G06V 20/10 |
| 2018/0211446 | A1* | 7/2018 | Robert | G06T 15/06 |
| 2020/0192389 | A1* | 6/2020 | ReMine | G06V 10/82 |
| 2020/0288186 | A1* | 9/2020 | Sun | H04N 21/4318 |
| 2020/0380779 | A1* | 12/2020 | Khazov | G06T 7/75 |
| 2021/0097341 | A1* | 4/2021 | Marco | G06V 20/64 |
| 2022/0415030 | A1* | 12/2022 | Hou | G06V 10/7747 |

OTHER PUBLICATIONS

M. Liu, Y. Zhang, J. He, J. Guo and Y. Guo, "Image-Based 3D Model Retrieval for Indoor Scenes by Simulating Scene Context," 2018 25th IEEE International Conference on Image Processing (ICIP), Athens, Greece, 2018, pp. 3658-3662, doi: 10.1109/ICIP.2018.8451547. (Year: 2018).*

E. Blasch, G. Seetharaman, K. Palaniappan, H. Ling and G. Chen, "Wide-area motion imagery (WAMI) exploitation tools for enhanced situation awareness," 2012 IEEE Applied Imagery Pattern Recognition Workshop (AIPR), Washington, DC, USA, 2012, pp. 1-8, doi: 10.1109/AIPR.2012.6528198. (Year: 2012).*

M. Butler, "The Developer's Guide to Cursor on Target," MITRE Center for Air Force Command & Control, 2005, doi: 10.21236/ADA637348 (Year: 2005).*

* cited by examiner

"BACKGROUND": [0, [0, 0, 0]],
"BUSHMASTER": [1, [0, 0, 255]],
"UNIT": [2, [75, 255, 40]],
"GWAGON": [3, [0, 255, 0]],
"CIVILIAN": [4, [0, 255, 255]],
"TANK": [5, [255, 0, 0]],
"UAV": [6, [255, 80, 20]],
"UAVLAUNCHER": [7, [255, 80, 190]],
"UAVSKYHOOK": [8, [255, 150, 0]],
"UNIMOG": [9, [255, 0, 150]],
"CAMONET": [10, [255, 150, 150]],
"GUN": [11, [0, 150, 0]],
"BUILDING": [12, [0, 150, 150]],
"BRIDGE": [13, [0, 195, 50]],
"UNKNOWN": [14, [255, 255, 255]],
"FOLIAGE": [15, [50, 100, 150]],

```
"properties": {
    "objectName": "FOLIAGE_1",
    "objid": "15",
    "onScreenRatio": 0.0875,
    "overlapRatio": 0.0
},
"type": "Feature"

"properties": {
    "objectName": "TANK_24",
    "objid": "5",
    "onScreenRatio": 0.75,
    "overlapRatio": 0.3778314917127072
},
"type": "Feature"
```

FLIGHT MISSION LEARNING USING SYNTHETIC THREE-DIMENSIONAL (3D) MODELING AND SIMULATION

CROSS-REFERENCE TO RELATED APPLICATION

This application claims the benefit of and priority to U.S. Provisional Application No. 63/125,368, entitled "FLIGHT MISSION LEARNING USING SYNTHETIC THREE-DIMENSIONAL (3D) MODELING AND SIMULATION", filed Dec. 14, 2020, which is incorporated by reference herein in its entirety.

BACKGROUND

Deep learning systems use large amounts of annotated training data in order to perform operations, such as for learning autonomous intelligence, surveillance, reconnaissance (ISR) missions. Current methods of data collection are manual and time-consuming. As a result, current methods are expensive and can take weeks or months to prepare a particular dataset. Moreover, because the data is collected manually, the process can lack consistency and may rely on the skill of the operator. Current methods also require the capture of real environmental data, which is not always possible, such as for ISR flights. For example, it is not uncommon for an unmanned aerial vehicle (UAV) to fly over a location in an area in order to find a ground object that has not necessarily been previously captured.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

In one implementation, a system for labeling an object is provided. The system includes a processor configured to execute instructions stored on a memory. The memory stores computer-readable instructions that, when executed by the processor, causes the processor to create a synthetic three-dimensional (3D) modeling environment scene; generate image data synthetically by an in-flight camera simulation, the image data being within the 3D modeling environment scene based on an orientation of a camera and including one or more objects, use a mask to identify the one or more objects in the 3D modeling environment scene, label the identified one or more objects using a cursor on target (COT) lookup table, and store the labeled identified one or more objects and flight metadata in a database as part of a training dataset to thereby train an artificial intelligence (AI) system. The trained AI system is configured to identify a real object corresponding to the label of the labeled identified one or more objects in the COT lookup table. The real object is a real-world, target object.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts:

Corresponding reference characters indicate corresponding parts throughout the drawings. In FIGS. 1 to 11, the systems are illustrated as schematic drawings. The drawings may not be to scale.

DETAILED DESCRIPTION

Figure 1:
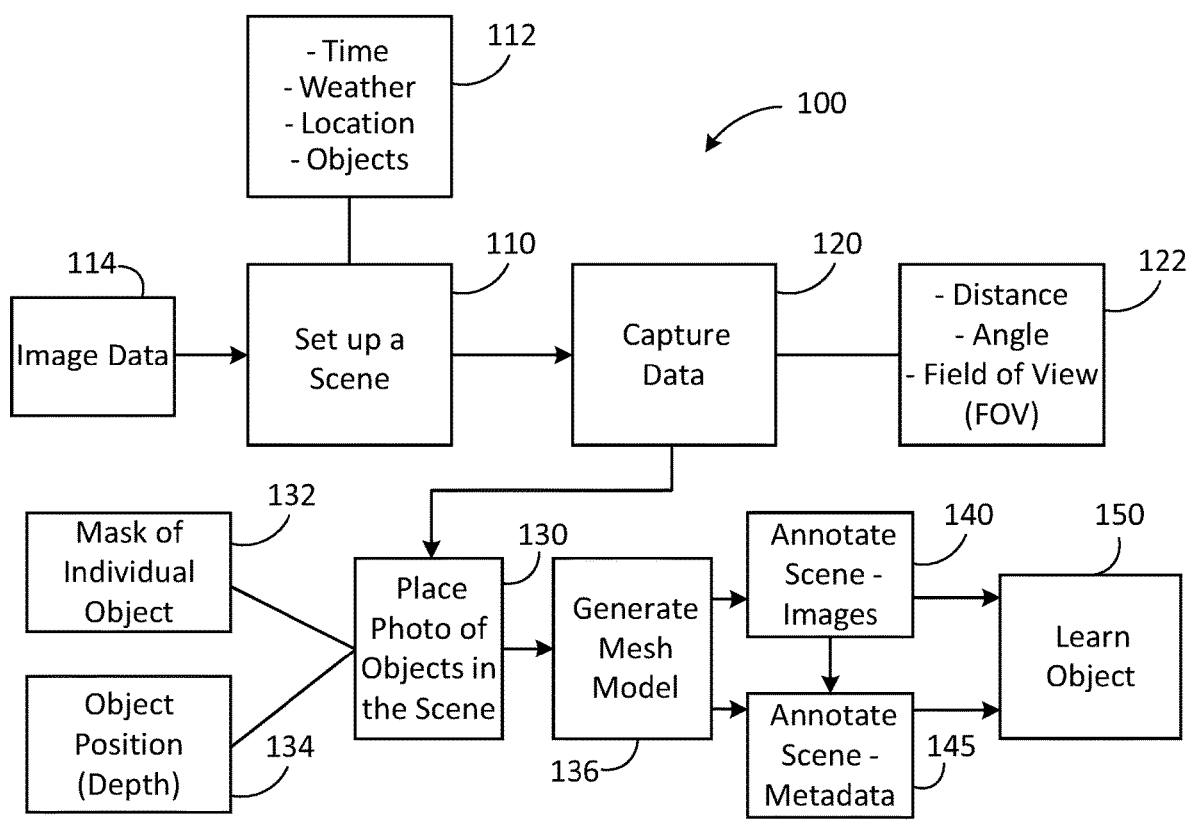
FIG. 1 illustrates a method of generating data from synthetic 3D models for machine learning according to various implementations of the present disclosure.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

Various implementations perform autonomous ISR flight learning using synthetic three-dimensional (3D) modeling. For example, a synthetic 3D modeling and simulation environment scene is utilized and a high definition computer graphics and a cross-platform game engine is applied to simulate a flight assignment. The training dataset is calculated from the 3D modeling scene and modeling parameters. In one example, images taken from an in-flight camera, readings from global positioning system (GPS) sensors, and readings from inertial measurement unit (IMU) sensors are derived from a flight physics model in the flight assignment and the coordinates in the 3D modeling scene. More particularly, implementations of the present disclosure utilize GPS and IMU simulated information to apply an appropriate bit-level mask to isolate the location of a feature of interest (FOI), such as an object. The present disclosure can then apply a standard character string to describe the object, such as a lookup table. The lookup table can improve translation to real-world identification, including handling uncertainty in identification. Sample features are randomized to create different scenes for training purposes.

Additionally, some implementations of the present disclosure provide a mechanism for a user to import a custom-built 3D mesh model and simulate ISR flights at novel (e.g., previously not visited) locations using terrain and texture features or satellite images. Some implementations further provide machine learning models trained systems for object detection in unknown environments. For example, in a flight example, the present disclosure is implemented in a new ISR flight assignment in a different environment for an object of interest that has not been previously captured. As such, various implementations provide configurable visual objects and knowledge ontology for learning computer vision models. In various examples, image data is collected, obtained, acquired, or detected. Image data comprising pixels or voxels represents an image in some examples (e.g., image of a scene) that can be generated, produced, or reconstructed. However, it should be appreciated that an image represented by the image data is not displayed in some examples. That is, reconstructing an image, for example, does not exclude implementations wherein image data representing an image is generated, but a viewable image is not generated and/or displayed. As such, an "image" refers to both viewable images and data representing a viewable image.

Accordingly, various implementations of the present disclosure provide high fidelity object annotation for learning segmentation and detection models at large scale, wherein the object annotations are automatically processed from a 3D modeling and simulation environment. As a result, reliance on manually prepared deep learning datasets, which require significant manual data collection and annotation may be reduced or essentially eliminated, thereby reducing the complexity, time consumption, and errors in the machine learning process. Thus, a more efficient machine learning process is thereby provided that improves the operation of a computer system.

For example, a system may have improved accuracy in identifying objects and may reduce the computation time required to make such an assessment. In this manner, when a processor is programmed to perform the operations described herein, the processor is used in an unconventional way, and allows for the more efficient generation of feature rich synthetic datasets to rapidly develop robust machine learning models to detect objects (e.g., real world objects in a real world ISR mission).

FIG. 1 illustrates a process for generating data from synthetic 3D models for machine learning according to various implementations of the present disclosure. The example of the method 100 illustrated in FIG. 1 is for illustration only. Other examples of the method 100 can be used or implemented without departing from the scope of the present disclosure.

In operation 110, a synthetic scene is set using image data 114. In some implementations, the image data 114 is synthetically generated by an in-flight camera simulation and includes an object previously rendered. The synthetic scene can be a synthetic 3D modeling and simulation environment scene and include or be defined by various elements 112 (e.g., characteristics), such as time, weather, location, and objects. In some implementations, one or more elements 112 are independently changed are varied for a particular scene. For example, the synthetic scene can include foggy weather in a desert location in the morning and include a moving ground object (e.g., a vehicle) as a synthetic object. In another example, the synthetic scene can include foggy weather in the desert location with the moving ground object as the synthetic object, but be set in the evening. By changing the time of day, the moving ground object is viewed differently under different settings. As another example, the synthetic scene can include a clear sky in the morning in an urban location and include a car and a person on the sidewalk as objects.

In operation 120, data of the synthetic scene is captured, such as from a simulated flight assignment or mission. In some implementations, the data is image data or video data of computer rendered terrain and objects and stored in a memory for future use in a synthetic scene. In one example, each image includes data 122 regarding a distance of a camera from the scene, an angle between the camera and the target, and a field of view (FOV) of the camera. In some implementations, the data 122 regarding the distance, angle, and FOV of the scene may be randomly selected within a specified range for capturing the appropriate scale and perspective angle of the scene.

In some implementations, the camera captures image data including multiple images that represent various changes to the data 122 of the synthetic scene. For example, a first image of a computer rendered scene can be taken from a distance of one hundred meters and a seventy-five-degree angle from the objects in the computer rendered scene. A second image of the computer rendered scene can be taken from a distance of eighty meters, a seventy-five-degree angle from the objects in the computer rendered scene, and a smaller FOV than the first image due to the camera being closer to the scene. Maintaining the angle while decreasing the distance between the objects in the scene and the camera provides a closer view of the objects in the scene from the same angle. A third image of the computer rendered scene can be taken from a distance of one hundred meters and a sixty-degree angle from the objects in the computer rendered scene. Changing the angle from seventy-five-degrees to sixty-degrees from the first image to the third image provides a different view of the computer rendered objects in the computer rendered scene from a constant distance.

In operation 130, a synthetic object corresponding to the computer rendered object captured by the camera is rendered in the synthetic scene. In one example, the synthetic object is randomly selected out of a plurality of objects synthetically generated by the camera simulation for identification in the synthetic scene. The object can be, for example, an object to be identified and recognized in the synthetic scene. The synthetic object is placed in the synthetic scene with known geometry, such as the mask of the individual object 132, and 3D coordinates, such as the synthetic object position and depth 134 within the synthetic scene.

In operation 136, a mesh model of at least one synthetic object in the synthetic 3D modeling environment scene is generated. The mesh model of the at least one synthetic object corresponds to the previously rendered object in the received image data 114 (e.g., objects synthesized in the synthetic 3D modeling environment scene). In some implementations, the mesh model includes pixel positions to identify the object in the scene so the object can later be learned.

Figure 2A:
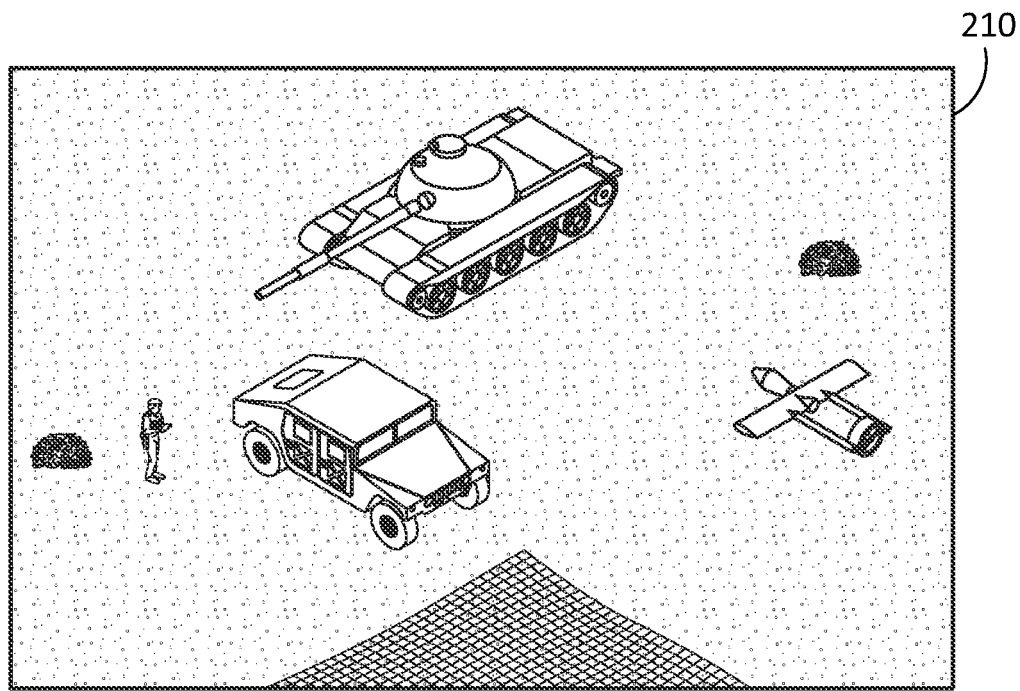
FIG. 2A illustrates a computer rendered synthetic image according to various implementations of the present disclosure.
Figure 2B:
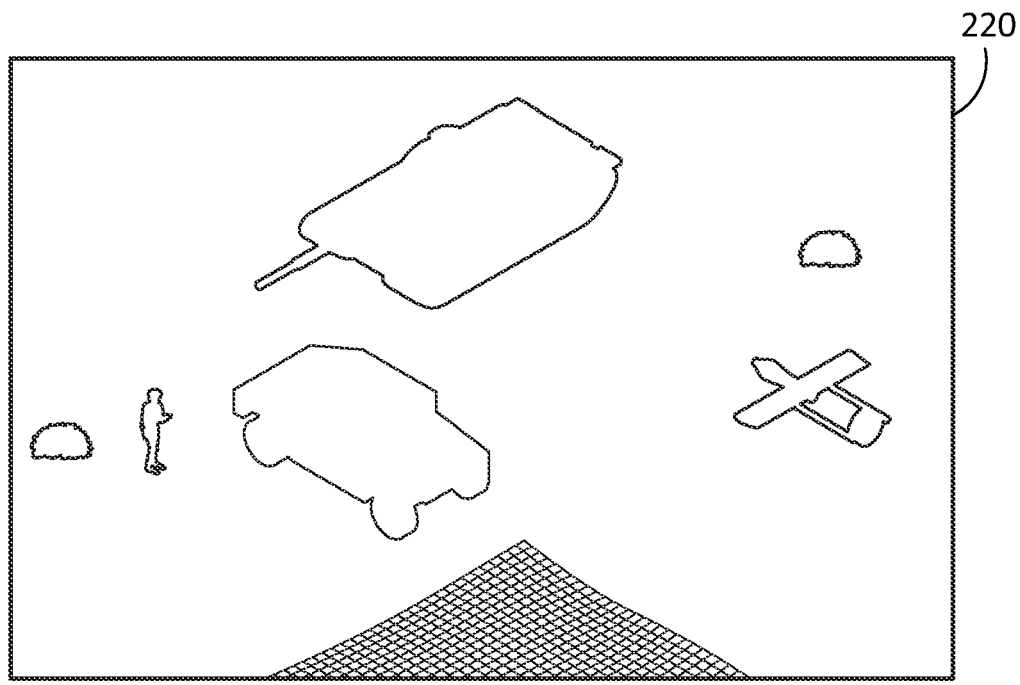
FIG. 2B illustrates an encoded portable network graphics (PNG) annotated image according to various implementations of the present disclosure.
Figures 2C, 3:
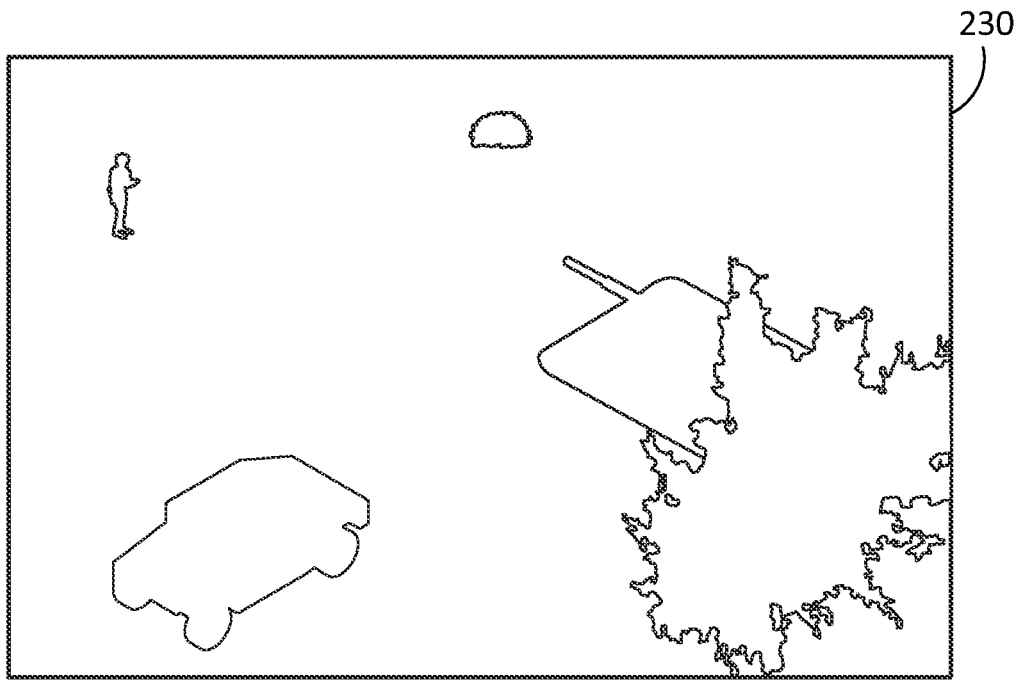
FIG. 2C illustrates an encoded PNG annotated image according to various implementations of the present disclosure.
FIG. 3 illustrates encoding information regarding the classes and color palette for the encoded PNG annotation according to various implementations of the present disclosure.

In operation 140, images in the scene are annotated using or based in part on the mesh model. For example, the object placed in the scene is annotated with pixel positions used to produce a binary mask, also referred to herein as a bit mask. Optionally, each object in the scene is annotated, including the objects originally in the scene. For example, FIGS. 2A and 2B illustrate the final object annotation as semantic segmentation derived from a 3D scene. FIG. 2A illustrates a computer rendered synthetic image 210 corresponding to an original image and FIG. 2B illustrates the bit mask 220 produced by the encoded portable network graphics (PNG) annotation. and FIG. 3 illustrates the coding information regarding the classes and color palette for the encoded PNG annotation 300. Although PNG is used as an example herein, other file formats and structures are contemplated. Additional description of the annotation of objects is described in greater detail below.

Returning to FIG. 1, in some examples, annotation of the images in the scene, in operation 140, is facilitated using the binary mask, or bit mask, which is a mask that includes the locations of the pixels corresponding to one or more objects. In one example, the binary mask is determined by calculating the pixel locations based on the object geometry and the parameters of the scene, which are determined by the data 122. The binary mask provides the annotation on all pixels that belong to the target object, and isolates the object from the background in the scene. By isolating the object in the scene, auxiliary, non-target objects in the scene such as trees, buildings, or signs may be ignored. By ignoring non-target objects, unnecessary annotations are avoided to save time and processing resources.

In operation 145, the metadata of the scene is annotated. The binary masks generated in operation 140 are placed in an ordered sequence and then merged into one encoded annotation, such as a PNG annotation. Encoded PNG annotation is a standard format for machine learning tasks such as semantic segmentation, which retains compatibility of the dataset to machine learning frameworks. In one example, the scene is annotated with an ordered sequence of the binary masks. In this example, a binary mask is created for each object in the scene, including the object placed in the scene in operation 130, as well as objects originally in the scene as elements 112. In one example, the ordered sequence of masks is merged into one encoded PNG annotation, as shown in FIGS. 2A, 2B, and 2C. The metadata annotation may also include the information of simulated sensor data (e.g. GPS and IMU data from the flight simulation), scene conditions represented, for example, by the elements 112 and simulation parameters in 122, which may be stored in the standard image metadata tags (e.g. exchangeable image file format (Exif)) and/or in the properties of the json file (FIG. 4)

Figures 4, 5:
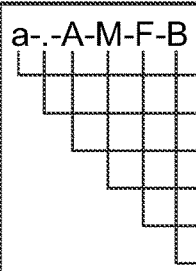
FIG. 4 illustrates a JavaScript Object Notation (json) file according to various implementations of the present disclosure.
FIG. 5 illustrates example character positions and field code of a COT string according to various implementations of the present disclosure.

For example, FIG. 2C illustrates the encoded PNG annotation 230 and FIG. 4 illustrates a JavaScript Object Notation (json) file 400 that includes additional GPS data, IMU flight data of the synthetic training system, object bounding boxes in the json annotation, the ratio of the object on the screen, and the percentage of the pixels blocked by another object. As shown in FIG. 4, the json file can further include a key string such as "objectName" which is a unique identification for multiple objects of the same class. In one example, the json annotation illustrated in FIG. 4 is extended to a more complex annotation schema with additional sensors and behaviors inputs from the 3D modeling. By extending the json annotation, implementations of the present disclosure can include additional machine learning algorithms, such as deep reinforcement learning. In the illustrated example, FOLIAGE_1 is the identified object and is assigned to "objectName".

As noted above, synthetic objects in the image captured of the scene are annotated. The synthetic objects are annotated using a knowledge ontology annotation schema. The knowledge ontology annotation schema is an extended cursor on target (COT) system. In one example, the ontology schema is configured specifically for ISR flight assignments and is compatible with existing unmanned aircraft systems (UAS) communication systems. As described herein, the ontology follows COT field type standard MIL-STD-2525 function codes. COT is a standard scheme in a category system that is standard for UAV operation. It should be appreciated that other annotation schema are contemplated and can be used with the present disclosure.

In some implementations, the object type in the training system is tagged by a COT string, which includes character positions and field codes as the standard COT atom group. The particular character string positions allow the object to be placed into a lookup table within the COT scope. The length of the character string is flexible, with the last character used to define, or label, the object as precisely as possible.

A COT string includes multiple, defined positions that each correspond to a hierarchical category level of classification. Each successive position corresponds to an analogous level of specificity. In some implementations, the COT string includes any number of positions to classify an object. In particular, the COT string includes at least one position for an object, but can include any number of positions with increasing specificity. As the number of positions in the COT string increases, a confidence level in the identification of the object also increases. For example, an object identified by a COT string that includes ten positions is identified with greater confidence than an object identified by a COT string that includes nine positions.

FIG. 5 illustrates example character positions and field codes of a COT string according to various implementations of the present disclosure. The example of the COT string illustrated in FIG. 5 is for illustration only. Other examples of the COT string can be used without departing from the scope of the present disclosure.

FIG. 5 illustrates a COT string 500 that recites "a.AMFB" to identify an object. As shown in FIG. 5, "a" is in the first position and identifies the object as an atom event describing an actual thing. A period (.) is in the second position and can refer to a particular element, such as element 2. An "A" is in the third position and identifies the object as "air". In one example, the object is identified by an "A" in the third position to classify the object as an object that moves through and/or is found in the air. An "M" is in the fourth position and identifies the object as "Military", such as a military-related object. An "F" is in the fifth position and identifies the object as "FixedWing". A "B" is in the sixth position and identifies the object as "Bomber".

As shown in FIG. 5, the particular object referred to by the COT string is described most specifically as a bomber. In other words, the last position of the COT string identifies the object with the greatest specificity, the next to last position identifies the object with the second to greatest specificity, and so forth. The first position identifies the object with the least specificity. In some implementations, a position of the COT string includes more than one option for identification. For example, the first position can identify an object as a type of matter, such as an atom (a). A second position can identify the object as known (k), hostile (h), or non-hostile (nh). A third position can identify the object by its movement type, such as air (A) or ground (G). As noted above, any suitable number of positions can be used. In some implementations, a COT string reading a-u-G corresponds to atom-unknown-Ground Object. A COT string reading a-u-G-x corresponds to atom-unknown-Ground Object-Miscellaneous (not in library). A COT string reading a-u-G-U-C corresponds to atom-unknown-Ground Unit-Combat. A COT string reading a-u-G-U-C-A corresponds to atom-unknown-Ground Unit-Combat-Armor. A COT string reading a-u-G-U-C-A-W corresponds to atom-unknown-Ground Unit-Combat-Armor-Wheeled. A COT string reading a-u-G-U-C-A-W-M corresponds to atom-unknown-Ground Unit-Combat-Armor-Wheeled-Medium. A COT string reading a-u-G-U-C-A-W-M-b corresponds to atom-unknown-Ground Unit-Combat-Armor-Wheeled-Medium-bushmaster. A COT string reading a-u-G-U-C-A-W-M-b-m corresponds to atom-unknown-Ground Unit-Combat-Armor-Wheeled-Medium-bushmaster-medic.

As described above, the confidence level of the identification increases as the number of positions in the string increases. In the examples above, the COT string a-u-G corresponding to atom-unknown-Ground Object identifies a ground object made of atoms, and it is unknown whether the ground object is hostile or friendly. In contrast, the COT string a-u-G-U-C-A-W-M-b-m corresponding to atom-unknown-Ground Unit-Combat-Armor-Wheeled-Medium-bushmaster-medic identifies the ground object with greater specificity. This string identifies the ground object as not only a target of interest, but also hostile, an object for combat, armored and wheeled, of medium size, a bushmaster, and a medic vehicle. In comparing the COT string a-u-G and the COT string a-u-G-U-C-A-W-M-b-m, the COT string a-u-G-U-C-A-W-M-b-m identifies the same object with additional specification, which increases the confidence level of the identification. The COT string for an object is applied through the dataset creation and used in machine learning model training and prediction, described in greater detail below, to maintain consistency through the system. As an example, the particular confidence percentages of the COT strings above is defined or provided as follows:

a-u-G corresponds to atom-unknown-Ground Object with thirty percent confidence.

a-u-G-x corresponds to atom-unknown-Ground Object-Miscellaneous (not in library) with forty percent confidence.

a-u-G-U-C corresponds to atom-unknown-Ground Unit-Combat with fifty percent confidence.

a-u-G-U-C-A corresponds to atom-unknown-Ground Unit-Combat-Armor with sixty percent confidence.

a-u-G-U-C-A-W corresponds to atom-unknown-Ground Unit-Combat-Armor-Wheeled with seventy percent confidence.

a-u-G-U-C-A-W-M corresponds to atom-unknown-Ground Unit-Combat-Armor-Wheeled-Medium with eighty percent confidence.

a-u-G-U-C-A-W-M-b corresponds to atom-unknown-Ground Unit-Combat-Armor-Wheeled-Medium-bushmaster with ninety percent confidence.

a-u-G-U-C-A-W-M-b-m corresponds to atom-unknown-Ground Unit-Combat-Armor-Wheeled-Medium-bushmaster-medic with one hundred percent confidence.

The present disclosure recognizes the challenges faced when attempting to apply synthetic modeling to real-world situations. In particular, the synthetic modeling can provide data that is not quickly and easily applicable to real-world situations, or the synthetic modeling can only be performed on data acquired in the real world. Accordingly, implementations of the present disclosure provide domain randomization techniques that can be applied to bridge the gap between synthetic worlds and real-world flight assignments. In particular, the domain randomization techniques improve robust detection and classification, for example, for real-world ISR flights. The applied domain randomization techniques do not assume that real-world images are available, but instead follow a randomized uniform distribution or a conditionally randomized known distribution that randomizes the scene configuration including the elements 112 and data 122. In one example, the 3D modeling environment scene is randomized by the time, weather, location, objects, and camera parameters. In addition, the 3D modeling environment scene can include a feature rich background terrain that can also be randomized. In some implementations, the feature rich background terrain depicts a desert terrain, forest terrain, urban terrain, ocean terrain, sky terrain, or any other suitable terrain. The randomization can further include multiple instances of 3D modeling environment scenes that run independently and simultaneously. Running multiple instances of 3D modeling environment scenes independently and simultaneously allows for rapid and robust identification and decrease the time needed to render multiple objects to populate a database with the identified objects. In various implementations, the dataset attributes statistics are a plot for a quality check.

Figure 6A:
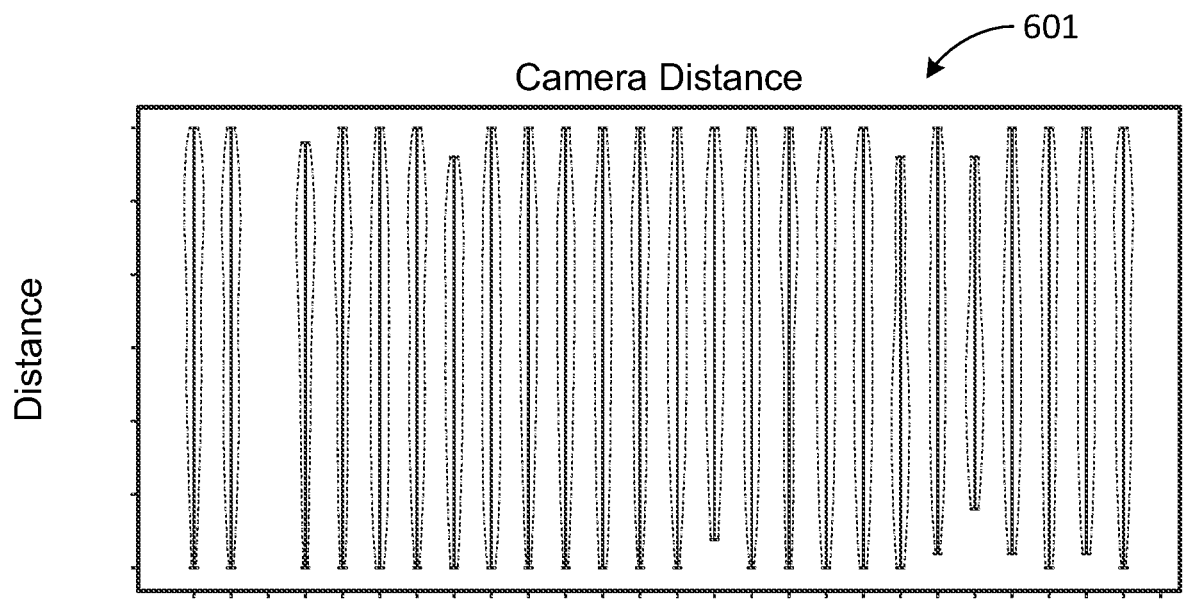
FIGS. 6A and 6B illustrate example dataset attributes statistics according to various implementations of the present disclosure.
Figure 6B:
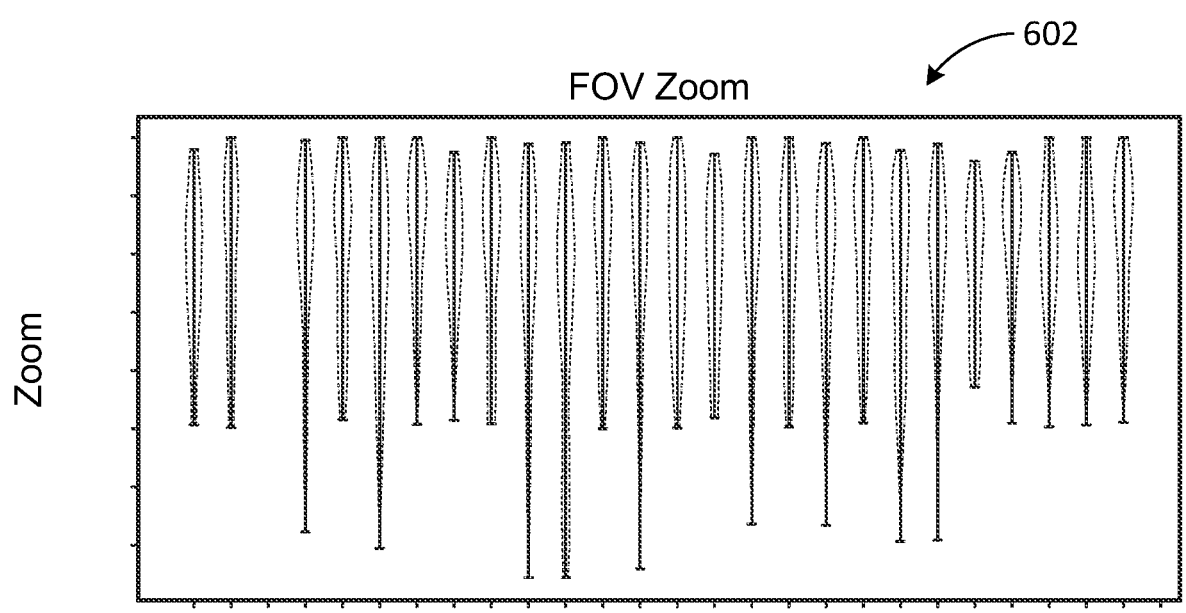

For example, FIGS. 6A and 6B illustrate example dataset attributes statistics according to various implementations of the present disclosure. In particular, FIG. 6A illustrates a histogram 601 depicting example dataset statistics for a camera distance from various objects in the 3D modeling environment scene according to various implementations of the present disclosure and FIG. 6B illustrates a histogram 602 depicting example dataset statistics for a FOV zoom from various objects in the 3D modeling environment scene according to various implementations of the present disclosure. In various implementations, the example dataset attributes statistics are used as a training dataset as described herein.

Although FIG. 6A illustrates a camera distance from various objects in the 3D modeling environment scene and FIG. 6B illustrates a FOV zoom from various objects in the 3D modeling environment scene, these examples should not be construed as limiting and any suitable dataset can be used as a training dataset. In various implementations, histograms illustrating statistics regarding frequency of objects, camera altitude, roll angle, mask overlap, bounding box area, camera/object relative angle, time of day, or any other suitable dataset can be used for training. Other example dataset attribute statistics include an overall object count, which maps a number of instances against a number of data points, and total versus acceptable objects using variable thresholds, which maps a number of objects against a number of images.

Applying the domain randomization techniques described herein has several advantages. In one example, the domain randomization techniques are applied to locations or environments which, in some implementations, have not been visited in a real-world flight assignment. As another example, objects are identified in an environment where the object has not been previously detected based on what has been learned by the synthetic 3D modeling. Because of these advantages, fewer data collect flight assignments need to be flown or can be eliminated entirely. Decreasing or eliminating data collect flight assignments has costs advantages and increases performance and safety.

The object annotation, ontology creation, and domain randomization described herein are developed and used, in one example, in conjunction to deliver a rapid end-to-end machine learning model upgrade for an evolving flight assignment. In one implementation, the flight assignment is an ISR mission. The combination of the object annotation, ontology creation, and domain randomization reduces the timeframe of the machine learning process, which includes the dataset creation, training, testing and model deployment with additional object to hours and removes the additional cost of manual processes.

Figure 7:
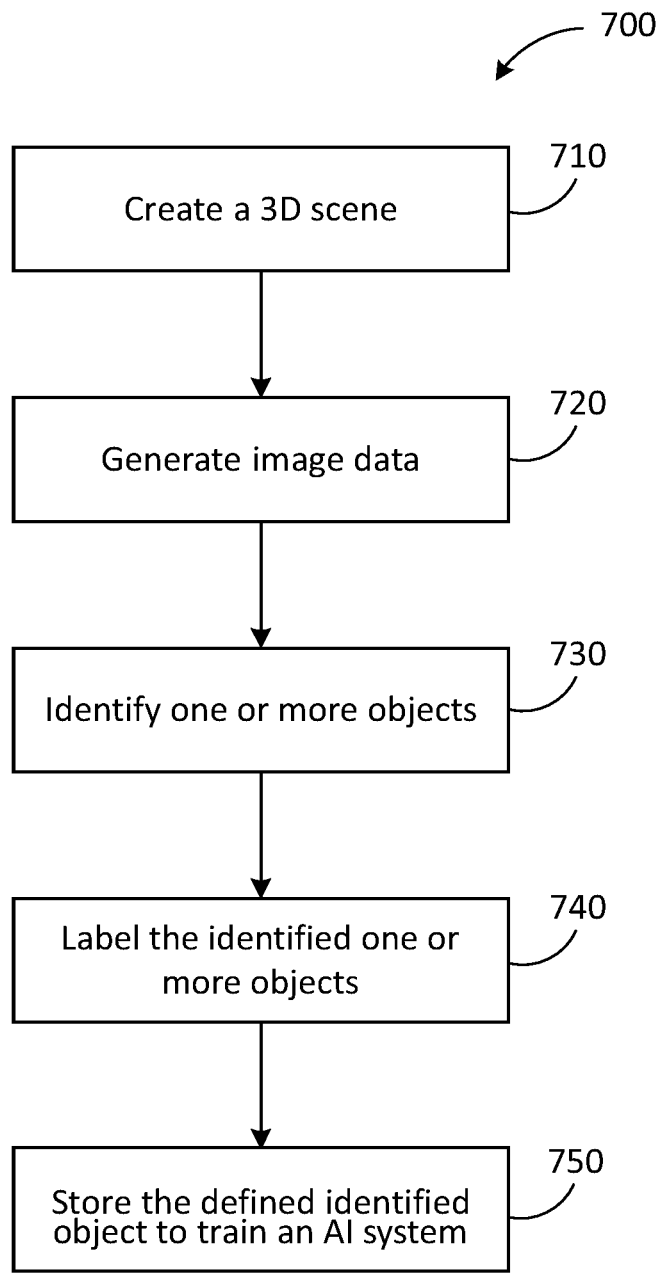
FIG. 7 illustrates a method of machine learning using synthetic 3D modeling according to various implementations of the present disclosure.

FIG. 7 illustrates a method of machine learning using synthetic 3D modeling according to various implementations of the present disclosure. The method 700 can be implemented by the electronic device 1100 illustrated in FIG. 11 below or any other suitable device.

In operation 710, the electronic device 1100 creates a 3D modeling environment scene. The 3D modeling environment scene is defined by a plurality of modeling parameters including one or more of an area of interest, a time of day, a particular terrain, and particular weather. As used herein, modeling parameters may be a configuration variable that is used to model the virtual environment. It should be appreciated that any type of parameters suitable for image modeling can be used. For example, the 3D modeling environment scene includes a randomized, feature rich background terrain at any particular time of day, in any particular weather, in a particular area of interest. Although the modeling parameters are described herein as including an area of interest, a time of day, a particular terrain, and particular weather, this description should not be construed as limiting and various implementations are possible. Additional modeling parameters can be added and/or some modeling parameters described herein can be removed without departing from the scope of the present disclosure.

In operation 720, the electronic device 1100 synthetically generates image data within the 3D modeling environment scene based on an orientation of a camera. In one example, the image data includes one or more objects synthetically generated by an in-flight camera simulation, such as the camera 1140, mounted on or embedded in a UAV. In some implementations, the electronic device 1100 generates the image data using the in-flight camera in real-time. In other implementations, the generated image data from the in-flight camera is stored in a memory, such as in the memory 1120, until the electronic device 1100 is ready to receive the image data in operation 720. The image data includes a distance of the camera from a computer rendered object, an angle, and an FOV. Each of the distance of the in-flight camera from the computer rendered object, the angle, and the FOV are randomly selected from within a predetermined range. For example, the electronic device 1100 can have a range of distances from the computer rendered object, angle, and FOV for use in the image data. The ranges can vary based on the computer rendered object, the electronic device 1100, or the terrain. For example, a desert terrain can have a wider range of usability than an urban terrain because the urban terrain includes buildings that decrease the visibility at a large distance, whereas a desert terrain has fewer features that decrease visibility.

In operation 730, the electronic device 1100 identifies the one or more objects in the 3D modeling environment scene. The electronic device 1100 can identify the one or more objects using a binary mask, or bit mask, and including a mesh model of the one or more objects. In some implementations, the mesh model of the at least one synthetic object corresponds to the object in the generated data and is placed in the synthetic 3D modeling environment scene. For example, the mesh model of the at least one synthetic object can be a virtual, synthetic version of the computer rendered object and is used for training an artificial intelligence (AI) system to learn the computer rendered object in a simulated environment.

In some implementations, the electronic device 1100 computes pixel positions of the object. In particular, the electronic device 1100 computes pixel positions in the mesh model of the object in the 3D modeling environment scene in the image data to identify the object. The electronic device 1100 applies 3D coordinates of the objects to the 3D modeling environment scene. In some implementations, the 3D coordinates are determined by one or more sensor(s) 1145 as discussed below. The data from the one or more sensor(s) 1145 is used to determine the distance of the in-flight camera from the at least one object, the angle, and the FOV based on a flight physics model and data received from global positioning system (GPS) and inertial measurement unit (IMU) sensors.

Figure 8:
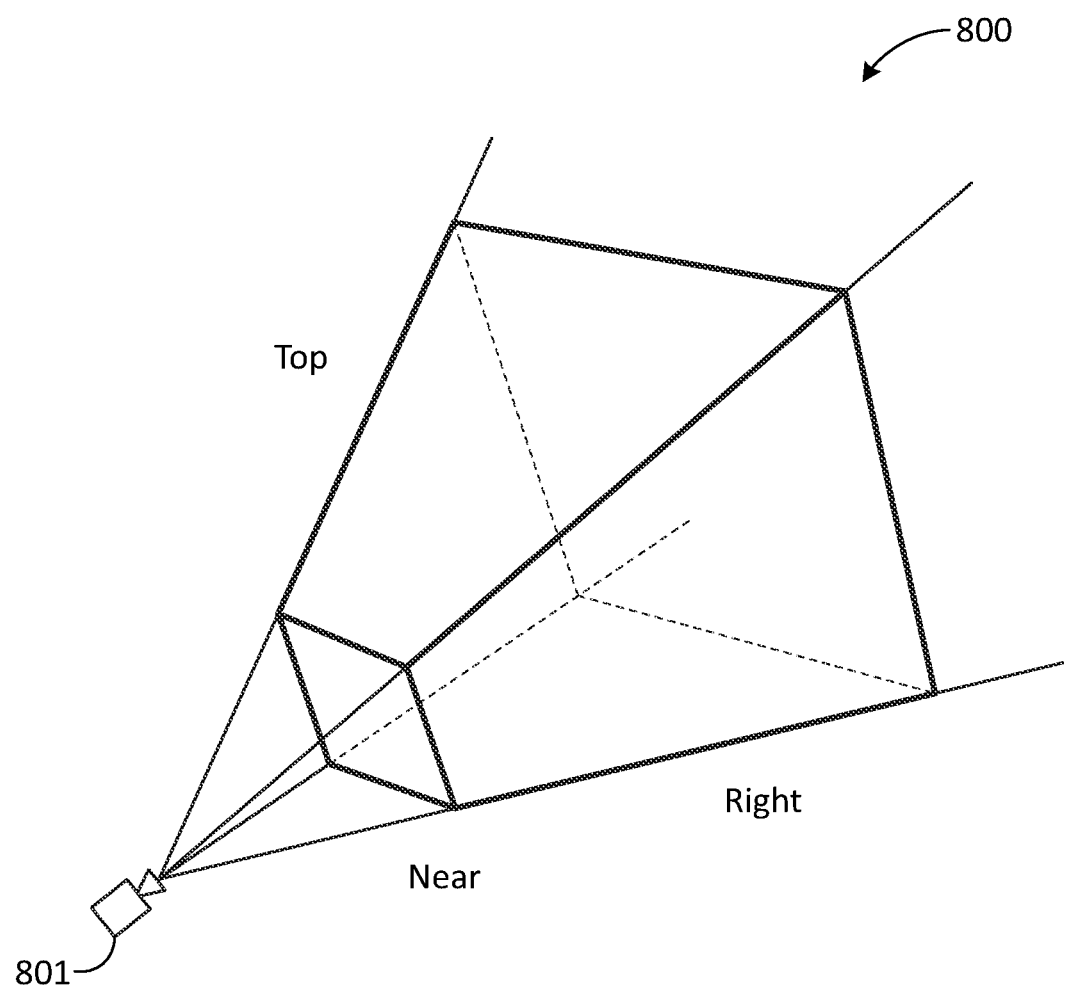
FIG. 8 illustrates a view frustrum according to various implementations of the present disclosure.

The data from the sensor(s) 1145 can determine, for example, the altitude of the in-flight camera and estimate the FOV based on the altitude. Based on the estimated FOV, the pixel position can be estimated and then compared to the actual pixel position. For example, FIG. 8 illustrates a view frustrum according to various implementations of the present disclosure. The view frustrum 800 illustrates a top plane, right plane, and near plane and shows how an object is viewed differently at different distances and angles from the viewer. The camera 801 illustrated in FIG. 8 can be the camera 1140 in some examples. In some implementations, the camera 801 has a particular orientation in the 3D modeling environment scene to capture image and/or video data of particular areas of the scene. In one implementation, the generated image and/or video data depends upon the FOV of the camera 801 and the position of the camera 801 relative to the objects captured, as illustrated in FIG. 8.

In some implementations, the electronic device 1100 further calculates a pixel position of the object based on the applied 3D coordinates of the objects and produces the mask as an annotation of the object. In some implementations, the pixel positions in the mesh model of the object are computed by isolating the object in the 3D modeling environment scene and excluding background pixels of the 3D modeling environment scene from the identified object.

In some implementations, as described herein, the electronic device 1100 computes pixel positions in the mesh model of the object in the 3D modeling environment scene. In so doing, the electronic device 1100 isolates the object in the 3D modeling environment scene and then excludes pixels of the 3D modeling environment scene from the identified object. By isolating pixels of the object and then excluding background pixels of the 3D modeling environment scene, which are not included in the pixels of the object, the object is more accurately identified in the 3D modeling environment scene.

In some implementations, the electronic device 1100 identifies more than one object in the image data. For example, the electronic device 1100 identifies a second object in the generated image data and produces a second mask for the second object in the scene. The electronic device 1100 generate a second mesh model of a second synthetic object corresponding to the second object in the captured image data, determines an ordered sequence of the binary mask and the second binary mask and merges the ordered sequence into an encoded PNG annotation. Although described herein as including a first and second binary mask corresponding to first and second objects, respectively, the ordered sequence that is merged into the encoded PNG annotation can include any number of binary masks corresponding to any number of objects that are identified in the captured image data. More or fewer than two binary masks can be used to generate the encoded PNG annotation depending on how many objects are identified in the image data.

In operation 740, the electronic device 1100 labels the identified at least one object using the COT lookup table. As described herein, the object is tagged by a COT string and stored in a COT lookup table. To label the identified object, the electronic device 1100 reads the string in the COT lookup table backwards to label the identified object. A confidence level of the identification is based on a length of the string. For example, a longer string includes more detailed information regarding the object, leading to a greater confidence that the label of the object is correct. In contrast, a shorter string includes less detail regarding the object, leading to a lesser confidence regarding the label of the object. In the example described above, a COT string reading a-u-G-U-C-A-W-M-b that corresponds to atom-unknown-Ground Unit-Combat-Armor-Wheeled-Medium-bushmaster, which has a greater confidence than the COT string reading a-u-G-U-C that corresponds to atom-unknown-Ground Unit-Combat.

In operation 750, the electronic device 1100 stores the labeled identified object in a database to thereby train an AI system, and the trained AI system can identify real object. In various implementations, the real object is a real-world, target object corresponding to the defined identified object and the object contained in the generated image data received in operation 720. In one example, the electronic device 1100 receives real-time image data from an in-flight camera mounted on a UAV, such as the camera 1140, recognizes the real-world, target object in the real-time image data, and identifies the real-world, target object based on the prediction of the machine learning models trained on the labeled object. In various examples, the database is the memory 1120 in the electronic device 1100 or any other suitable storage medium.

Accordingly, implementations of the present disclosure rapidly develop robust machine learning models from a feature-rich synthetic dataset. The robust machine learning models improve the detection of real-world object in a real-world ISR flight assignment without flying additional flight assignments to manually collect data in some examples.

Figure 9:
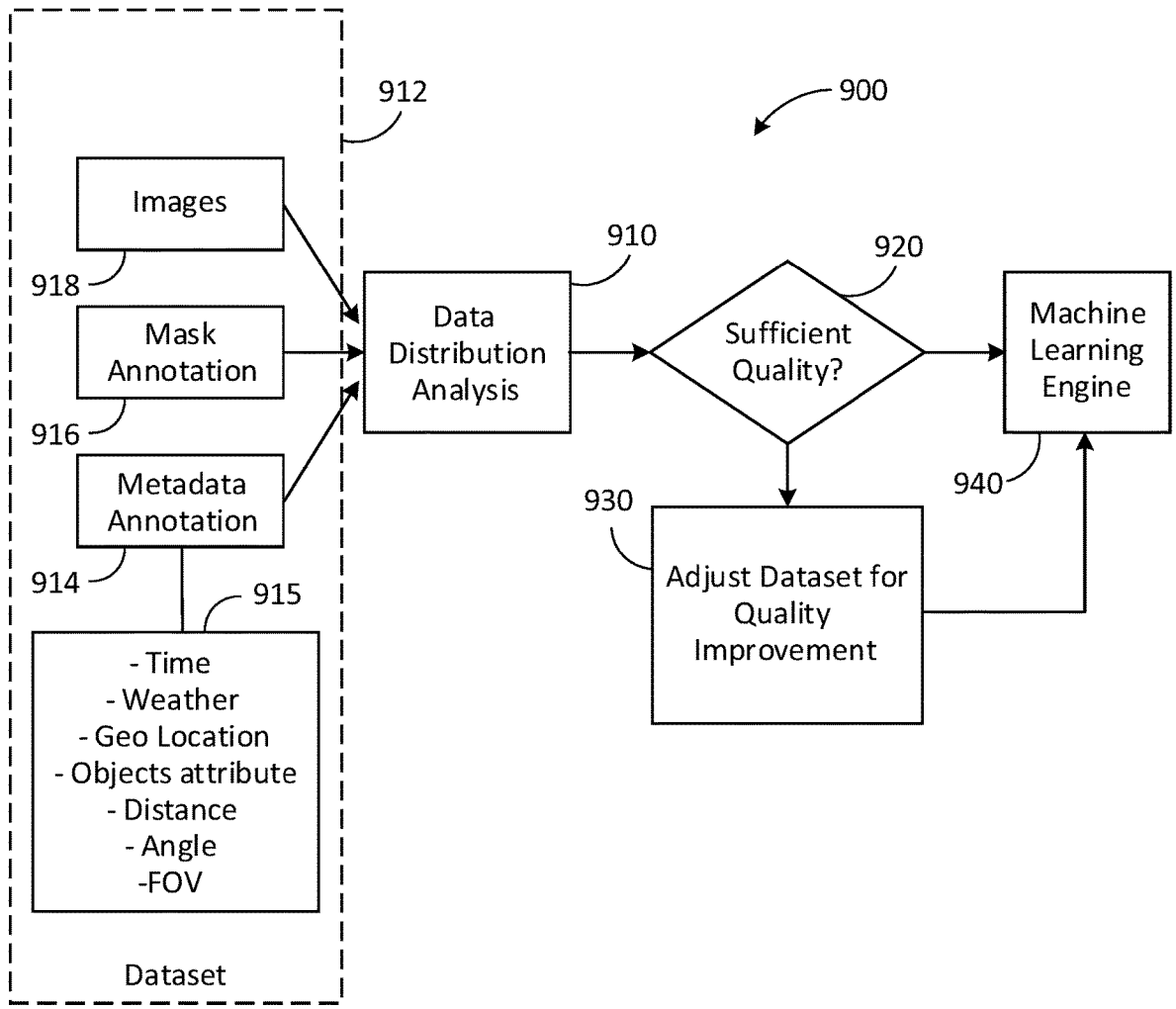
FIG. 9 illustrates a method for performing quality assessment according to various implementations of the present disclosure.

FIG. 9 illustrates a method for performing quality assessment according to various implementations of the present disclosure. In particular, the method 900 performs quality assessment for a machine learning engine according to various implementations of the present disclosure. The method 900 illustrated in FIG. 9 can be implemented by the electronic device 1100 illustrated in FIG. 11 below or any other suitable device. Various implementations of the method 900 can be performed without departing from the scope of the present disclosure.

In operation 910, the electronic device 1100 performs a data distribution analysis. The distribution analysis analyzes data from a dataset 912. The dataset 912 includes flight metadata annotation 914, mask annotation 916, and images 918. The metadata is annotated using the elements 915, which includes time data, weather data, geo location data, attributes of objects, a distance from the object, an angle from the object, and a field of view of the image in the illustrated example. For example, the elements 915 can include some or all of the elements 112 and data 122 illustrated in FIG. 1.

In operation 920, the electronic device 1100 reviews the data analyzed in operation 910 to determine whether the dataset is of sufficient quality. The quality of the dataset can be a measurement of the confidence level of the identification of a particular object. For example, a sufficient quality threshold determines whether an object is identified with a particular confidence level. The sufficient quality threshold can be set at any suitable confidence level, such as sixty percent or seventy percent. In some implementations, the threshold is variable. For example, the threshold can vary based on the object to be identified, the object type to be identified, the particular flight assignment, the environment, the time of day, the weather, or the individual manning the UAV that flies the flight assignment. If the dataset is determined not to be of sufficient quality, the method 900 proceeds to operation 930. If the dataset is determined to be of sufficient quality, the method 900 proceeds to operation 940.

In operation 930, based on the dataset being determined to not be of sufficient quality, the electronic device 1100 adjusts the dataset to improve the quality of the dataset. In various implementations, the dataset is adjusted by adding data to the dataset, removing data from the dataset, re-annotating the data to increase the likelihood of training a more accurate model, or any other sufficient quality checks. Following the dataset being adjusted, the dataset is again reviewed for sufficient quality. Upon determining the dataset is still not of sufficient quality, the dataset is again adjusted, as described herein, until the dataset is determined to be of sufficient quality. Upon determining the dataset is of sufficient quality, the method 900 proceeds to operation 940.

In operation 940, the electronic device 1100 executes a machine learning engine using the dataset. The machine learning engine can then learn from the data, for example, for use in ISR flight assignments. For example, in implementations where the dataset is annotation of an image, the machine learning engine learns to detect and identify the object in new environments during ISR flight assignments.

Figure 10:
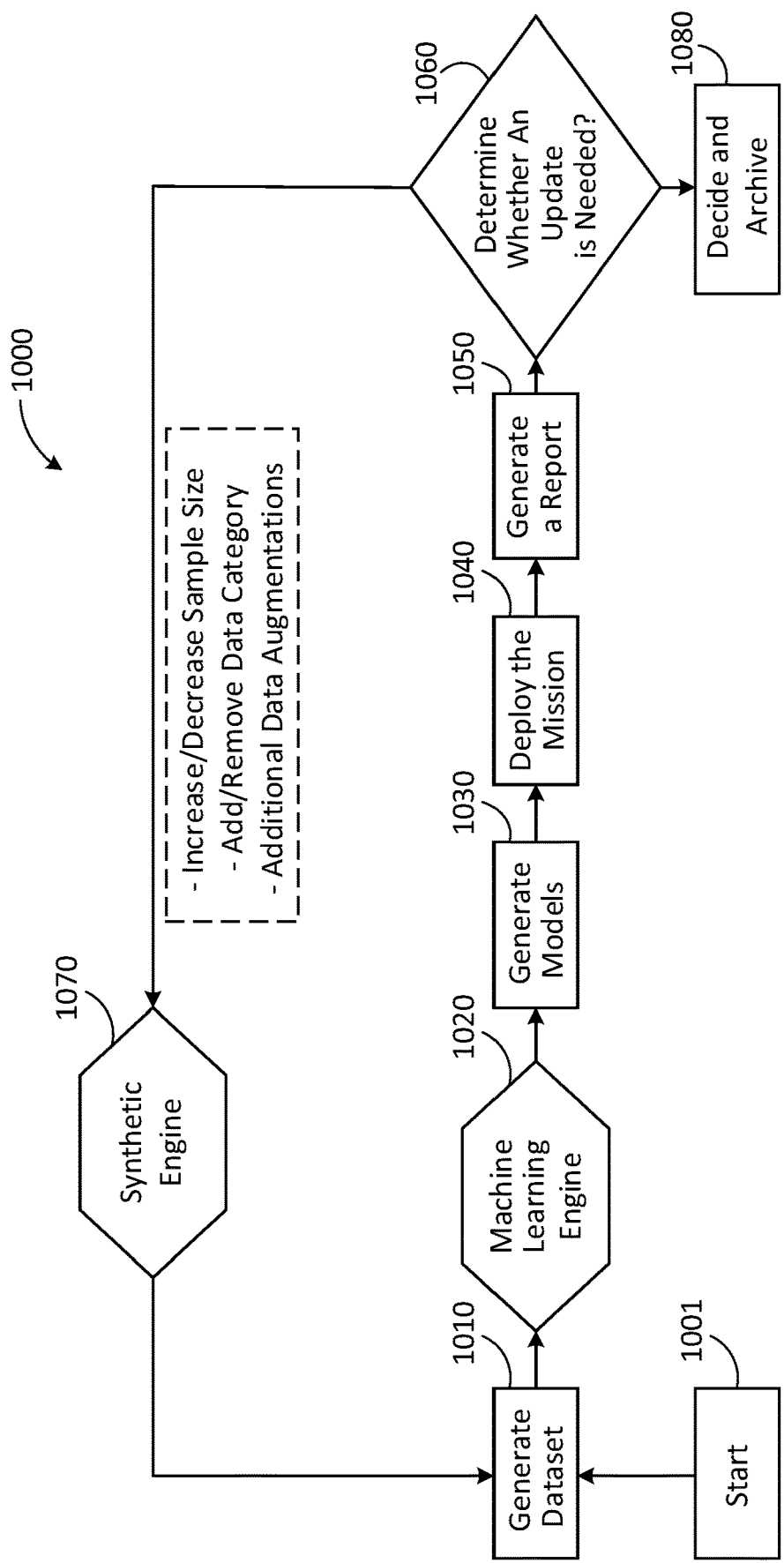
FIG. 10 illustrates a method for maintaining and updating a synthetic learning model according to various implementations of the present disclosure.

FIG. 10 illustrates a method for maintaining and updating a synthetic learning model according to various implementations of the present disclosure. In particular, the method 1000 is a method of maintaining and updating a synthetic learning model for autonomous ISR flight learning according to various implementations of the present disclosure. The method 1000 illustrated in FIG. 10 can be implemented by the electronic device 1100 illustrated in FIG. 11 below or any other suitable device.

In operation 1001, the method 1000 starts. In operation 1010, the electronic device 1100 generates a dataset. In various implementations, the dataset is generated as described with respect to the dataset 912 of the method 900.

In other words, the dataset can include annotated images, mask annotation, and metadata annotation that includes variables such as time, weather, geo location, attributes of the objects, distance from the object, angle from the object, and FOV. In operation 1020, the electronic device 1100 executes a machine learning engine. In various implementations, the machine learning engine is executed as described in operation 940 of the method 900. In so doing, the machine learning engine learns from the data to produce models for use in ISR flight assignments.

In operation 1030, the electronic device 1100 generates models learned from the stored dataset. The generated model can include a model learned to identify one or more objects, such as the object that is annotated in the dataset 912, or placed in a synthetic 3D modeling environment scene. In operation 1040, the electronic device 1100 deploys a simulated flight assignment for the model generated in operation 1030. In some implementations, the simulated flight assignment is an ISR mission that is executed in synthetic 3D modeling environment scene. The flight assignment is designed to simulate an ISR flight assignment executed by a UAV in which the UAV performs ISR of the synthetic 3D modeling environment scene. In one example, the ISR includes the identification of targets in the scene. Additionally, operation 1040 serves the purpose of deploying the generated machine learning models in the system for real-world ISR flight assignments. As the dataset is optimized and updated by continuous cycles of the method 900, as described below, the system is able to identify objects more accurately based on the experience of deployed, simulated flight assignments.

In operation 1050, the electronic device 1100 generates a report based on results of the deployed flight assignments. The report can include details regarding the identification of the one or more objects placed in the synthetic 3D modeling environment scene, or/and the identification of the one or more objects in the real-world scene. For example, the report includes details indicating which particular objects were identified correctly and which particular objects were not identified correctly during the deployed flight assignment. Objects that were not identified correctly can include objects that were not identified and/or objects that were identified incorrectly.

In operation 1060, based on the results of the report, the electronic device 1100 determines whether an update to the dataset is needed. In some implementations, the determination is made based on whether the percentage of correctly identified objects is at or above a certain threshold. For example, updates are determined to be needed if a percentage of correctly identified objects is equal to or greater than sixty percent, seventy-five percent, eighty percent, or any other percentage suitable to determine that an amount or number of objects is correctly identified. In one example, the threshold is variable, such that one flight assignment uses a greater percentage of correctly identified objects for an update to not be needed than another flight assignment. In other implementations, the determination is made based on whether a particular object was identified correctly. For example, the deployed flight assignment includes objects such as a car, a tank, a house, and a lake as objects to be identified, but the determination whether the update is needed is based on only whether one of the objects, such as the tank, was identified correctly. Upon determining an update is needed, the method 1000 proceeds to operation 1070. Upon determining an update is not needed, the method 1000 proceeds to operation 1080.

In operation 1070, the electronic device 1100 executes a synthetic modeling engine to update the dataset. In one implementation, the dataset is updated by one or more of increasing or decreasing the sample size of annotated objects and/or masks, adding or removing data categories, and performing additional data augmentations. Based on these updates, a new dataset is generated in operation 1010 and machine learning is executed in operation 1020. The process continues again through operations 1010 through 1060, where another determination of whether an update is performed. By continuing to repeat method 700 until an update is no longer needed, the dataset is optimized for training for ISR flight assignments.

In operation 1080, upon determining that an update is not needed, the electronic device 1100 archives the identification of the objects and the dataset. For example, the dataset and machine learning models are archived and stored in a database in a memory, such as the memory 1120 described in greater detail below. In the memory 1120, the machine learning models can be accessed or retrieved during a real-world ISR flight assignment for object identification without additional data collection flight assignments being needed.

Figure 11:
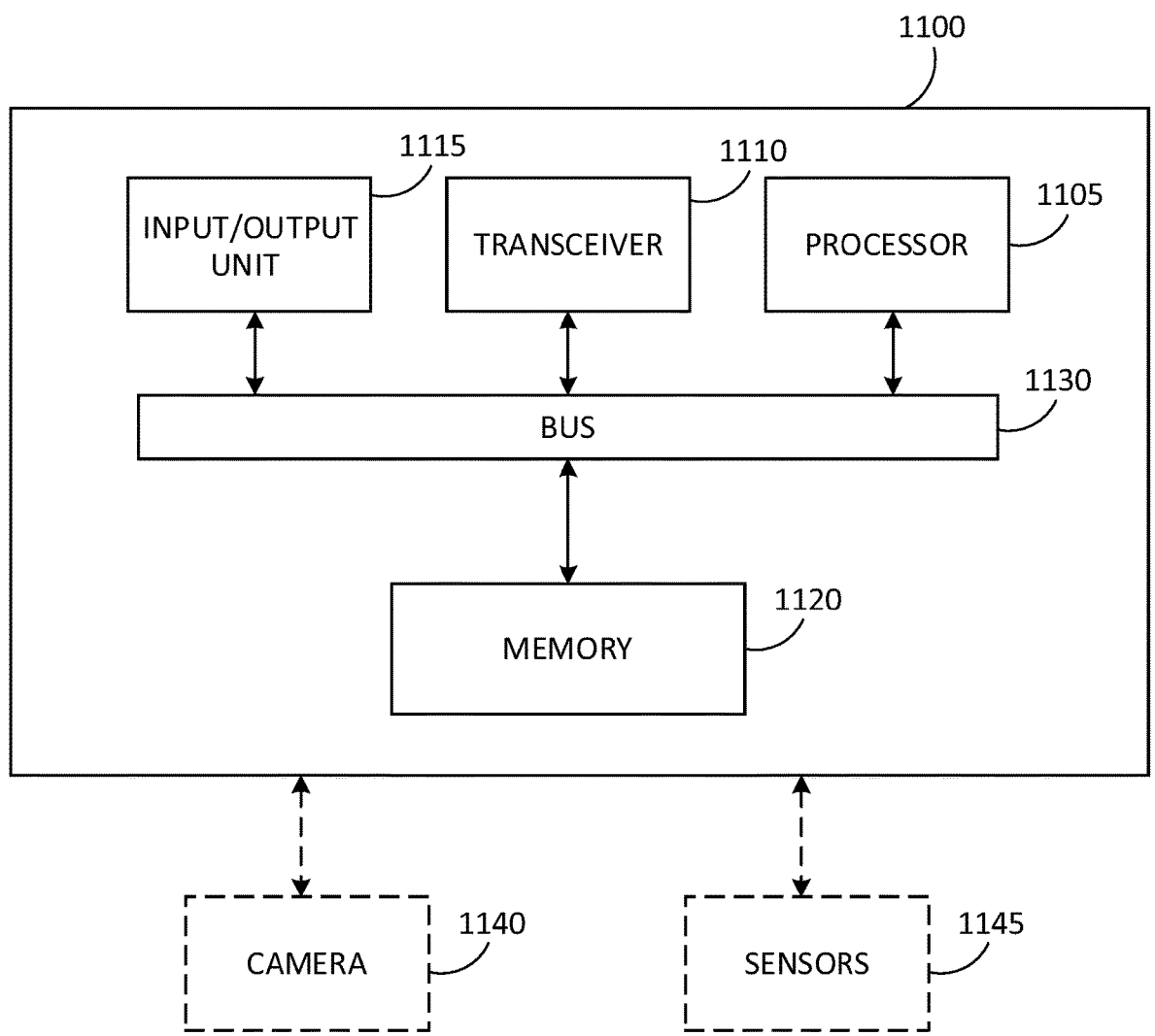
FIG. 11 illustrates an electronic device according to various implementations of the present disclosure.

FIG. 11 illustrates an electronic device according to various implementations of the present disclosure. The example of the electronic device 1100 illustrated in FIG. 11 is for illustration only. Other examples of the electronic device 1100 can be used without departing from the scope of the present disclosure.

The electronic device 1100 includes a processor 1105, a transceiver 1110, an input/output (I/O) unit 1115, and a memory 1120. The processor 1105, the transceiver 1110, the I/O unit 1115, and the memory 1120 are connected to one another by a bus 1130 to send messages between each of the components of the electronic device 1100. The memory 1120 further includes a storage to store data and various programs. The programs include an operating system and one or more applications that can be executed by the processor 1105.

The processor 1105 is configured to execute the operating system and the one or more applications stored in the memory 1120. The applications include particular program code executed by the processor 1105 that can perform one or more of the functions described in greater detail below.

The transceiver 1110 is configured to send and receive signals to and from, respectively, the electronic device 1100. For example, the transceiver 1110 sends and receives signals to an external device, such as a user equipment (UE), a server, or any other suitable electronic device.

The I/O unit 1115 is configured to allow the electronic device 1100 to directly connect to another device. For example, the I/O unit 1115 includes one or more ports configured to allow connections to and from the electronic device 1100.

The electronic device 1100 can optionally include or be connected to a camera 1140. The camera 1140 is configured to capture image or video data. The captured image or video data is stored in the memory 1120 and analyzed by the processor 1105. In some implementations, the processor 1105 annotates the captured image or video data and use the annotated data in machine learning, such as synthetic 3D modeling for autonomous ISR flight learning. The annotated data is further used for training of an AI system to improve identification of a real-world target object.

The electronic device 1100 can optionally include or be connected to one or more sensors 1145. The sensors can include one or both of global positioning system (GPS)

sensors and inertial measurement unit (IMU) sensors. The processor 1105 receives data from the sensor(s) 1145 and use the data to determine coordinates of the electronic device 1100 throughout a flight physics model in the 3D environment modeling scene. In some implementations, data from the sensor(s) 1145 is used to gather the data 122 regarding a distance of the camera from the scene, an angle between the camera and the target, and a field of view (FOV) of the camera.

As indicated above, program code instructions may be stored in memory, and executed by processing circuitry that is thereby programmed, to implement functions of the systems, subsystems, tools, and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded, and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. It will also be understood that one or more functions, and combinations of functions, may be implemented by special purpose hardware-based computer systems and/or processing circuitrys which perform the specified functions, or combinations of special purpose hardware and program code instructions.

The following clauses describe further aspects of the present disclosure. In some implementations, the clauses described below can be further combined in any subcombination without departing from the scope of the present disclosure.

Clause Set A:

A1. A system for labeling an object, the system comprising:
a processor configured to execute instructions stored on a memory; and
the memory storing computer-readable instructions that, when executed by the processor, causes the processor to:
create a synthetic three-dimensional (3D) modeling environment scene,
generate image data synthetically by an in-flight camera simulation, the image data being within the 3D modeling environment scene based on an orientation of a camera and including one or more objects;
use a mask to identify the one or more objects in the 3D modeling environment scene,
label the identified one or more objects using a cursor on target (COT) lookup table, and
store the labeled identified one or more objects and flight metadata in a database as part of a training dataset to thereby train an artificial intelligence (AI) system, wherein the trained AI system is configured to identify a real object corresponding to the label of the one or more identified one or more objects in the COT lookup table, wherein the real object is a real-world, target object, A2. The system of clause A1, wherein the synthetic 3D modeling environment scene is defined by a plurality of modeling parameters including the one or more objects, and is defined by an area of interest, a time of day, a terrain, and a weather condition.

A3. The system of clause A1, wherein:
the image data generated synthetically by the in-flight camera simulation includes a distance of the camera from the one or more objects, an angle, and a field of view (FOV); and
each of the distance of the in-flight camera from the one or more objects, the angle, and the FOV are randomly selected from within a predetermined range.

A4. The system of clause A3, wherein the processor is configured to:
apply 3D coordinates of the at least one object to the synthetic 3D modeling environment scene, the 3D coordinates determined by the distance of the in-flight camera from the one or more objects, the angle, and the FOV, based on a flight physics model and data received from global positioning system (GPS) and inertial measurement unit (IMU) sensors,
calculate a pixel position of the one or more objects based on the applied 3D coordinates of the at least one object; and
produce the mask as an annotation of the one or more objects.

A5. The system of clause A4, wherein the processor is further configured to:
identify a second object of the one or more objects in the synthetically generated image data,
produce a second mask for the second object,
determine an ordered sequence of the mask and the second mask, and
merge the ordered sequence into an encoded portable network graphics (PNG) annotation.

A6. The system of clause A1, wherein, to label the identified object, the processor is configured to read a string in the COT lookup table, beginning with a final character in the COT lookup table, to label the identified one or more objects using pre-existing label information, wherein a confidence level of the label is based on a length of the string.

A7. The system of clause A1, wherein the processor is further configured to:
receive real-time image data from the in-flight camera,
recognize the real-world, target object in the real-time image data,
compare the real-world, target object to stored objects in the database, and identify the real-world, target object based on the real-world, target object corresponding to the labeled identified object.

A8. The system of clause A1, wherein the processor is configured to produce the mask by isolating the one or more objects in the synthetic 3D modeling environment scene and exclude pixels of the synthetic 3D modeling environment scene from the identified object.

Clause Set B:

B1. A method for labeling an object, the method comprising:
  creating a synthetic three-dimensional (3D) modeling environment scene;
  generating image data synthetically by an in-flight camera simulation, the image data being within the 3D modeling environment scene based on an orientation of a camera and including one or more objects;
  using a mask to identify the one or more objects in the 3D modeling environment scene;
  labeling the identified one or more objects using a cursor on target (COT) lookup table; and
  storing the labeled identified one or more objects and flight metadata in a database as part of a training dataset to thereby train an artificial intelligence (AI) system, wherein the trained AI system is configured to identify a real object corresponding to the label of the one or more identified one or more objects in the COT lookup table, wherein the real object is a real-world, target object.

B2. The method of clause B1, wherein the synthetic 3D modeling environment scene is defined by a plurality of modeling parameters including the one or more objects and is defined by an area of interest, a time of day, a terrain, and a weather condition.

B3. The method of clause B1, wherein:
  the image data generated synthetically by the in-flight camera simulation includes a distance of the camera from the one or more objects, an angle, and a field of view (FOV); and
  each of the distance of the in-flight camera from the one or more objects, the angle, and the FOV are randomly selected from within a predetermined range.

B4. The method of clause B3, further comprising:
  applying 3D coordinates of the one or more objects to the synthetic 3D modeling environment scene, the 3D coordinates determined by the distance of the in-flight camera from the one or more objects, the angle, and the FOV, based on a flight physics model and data received from global positioning system (GPS) and inertial measurement unit (IMU) sensors,
  calculating a pixel position of the at least one synthetic one or more objects based on the applied 3D coordinates of the one or more objects; and
  producing the mask as an annotation of the one or more objects B5. The method of clause B4, further comprising:
  identifying a second object of the one or more objects in the synthetically generated image data,
  producing a second mask for the second object,
  determining an ordered sequence of the mask and the second mask, and
  merging the ordered sequence into an encoded portable network graphics (PNG) annotation.

B6. The method of clause B1, wherein labeling the identified object comprises reading a string in the COT lookup table, beginning with a final character in the COT lookup table, to label the identified one or more objects using pre-existing label information
  wherein a confidence level of the label is based on a length of the string.

B7. The method of clause B1, further comprising:
  receiving real-time image data from the in-flight camera,
  recognizing the real-world, target object in the real-time image data,
  comparing the real-world, target object to stored objects in the database, and
  identifying the real-world, target object based on the real-world, target object corresponding to the labeled identified object.

B8. The method of clause B1, wherein producing the mask comprises isolating the one or more objects in the synthetic 3D modeling environment scene and exclude pixels of the synthetic 3D modeling environment scene from the identified object.

Clause Set C:

C1. A computer program product, comprising a computer usable medium having a computer readable program code embodied therein, the computer readable program code adapted to be executed, to label objects, to:
  create a synthetic three-dimensional (3D) modeling environment scene;
  generate image data synthetically generated by an in-flight camera simulation, the image data being within the 3D modeling environment scene based on an orientation of a camera and including one or more objects;
  use a mask to identify the one or more objects in the 3D modeling environment scene; label the identified one or more objects using a cursor on target (COT) lookup table; and
  store the labeled identified one or more objects and flight metadata in a database as part of a training dataset to thereby train an artificial intelligence (AI) system, wherein the trained AI system is configured to identify a real object corresponding to the label of the one or more identified one or more objects in the COT lookup table, wherein the real object is a real-world, target object.

C2. The computer program code of clause C1, wherein:
  the image data synthetically generated by the in-flight camera simulation includes a distance of the camera from the one or more objects, an angle, and a field of view (FOV),
  each of the distance of the in-flight camera from the one or more objects, the angle, and the FOV are randomly selected from within a predetermined range,
  the computer program code is further adapted to:
  apply 3D coordinates of the one or more objects to the synthetic 3D modeling environment scene, the 3D coordinates determined by the distance of the in-flight camera from the one or more objects, the angle, and the FOV, based on a flight physics model and data received from global positioning system (GPS) and inertial measurement unit (IMU) sensors,
  calculate a pixel position of the one or more objects based on the applied 3D coordinates of the one or more objects, and
  produce the mask as an annotation of the one or more objects, and
  the computer program code is further adapted to:
  identify a second object in the synthetically generated image data,
  produce a second mask for the second object, determine an ordered sequence of the mask and the second mask, and merge the ordered sequence into an encoded portable network graphics (PNG) annotation.

C3. The computer program code of clause C1, wherein the computer program code is further adapted to read a string in the COT lookup table, beginning with a final character in the COT lookup table, to label the identified object using pre-existing label information, wherein a confidence level of the label is based on a length of the string.

C4. The computer program code of clause C1, wherein the computer program code is further adapted to:

receive real-time image data from the camera, recognize the real-world, target object in the real-time image data, compare the real-world, target object to stored objects in the database, and identify the real-world, target object based on the real-world, target object corresponding to the labeled identified object.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an' item refers to one or more of those items.

The implementations illustrated and described herein as well as implementations not specifically described herein but with the scope of aspects of the claims constitute exemplary means for generating, by a processor, a delta component of the base component, the base component being included in a base fault domain, wherein generating includes: based on identifying a first fault domain of a plurality of fault domains that includes a witness component associated with a distributed data object with which the base component is associated, exemplary means for selecting the first fault domain as a target fault domain for the delta component; otherwise, based on identifying a second fault domain of the plurality of fault domains that includes at least one data component, wherein the at least one data component of the second fault domain includes a different address space than an address space of the base component, exemplary means for selecting the second fault domain as the target fault domain for the delta component; otherwise, based on identifying a third fault domain of the plurality of fault domains that is unused, exemplary means for selecting the third fault domain as the target fault domain for the delta component; and exemplary means for placing, by the processor, the delta component on the target fault domain, wherein the target fault domain is different from the base fault domain.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

Although the present disclosure has been described with reference to various implementations, various changes and modifications can be made without departing from the scope of the present disclosure.

What is claimed is:

1. A system for labeling an object, the system comprising:
a processor configured to execute instructions stored on a memory; and
the memory storing computer-readable instructions that, when executed by the processor, causes the processor to:
create a synthetic three-dimensional (3D) modeling environment scene;
generate image data synthetically by an in-flight camera simulation, the image data being within the synthetic 3D modeling environment scene based on an orientation of a camera and including a plurality of objects;
use a first mask to identify a set of objects of the plurality of objects in the synthetic 3D modeling environment scene;
identify a second object of the plurality of objects in the image data;
produce a second mask for the second object;
determine an ordered sequence of the first mask and the second mask, wherein each of the first mask and the second mask is a binary mask;
label the identified set of objects using a cursor on target (COT) lookup table, wherein, for an identified object of the identified set of objects, a label of the identified object is based on a string in the COT lookup table, and wherein a confidence level of the label is based on a length of the string; and
store the labeled identified set of objects and flight metadata in a database as part of a training dataset to thereby train an artificial intelligence (AI) system, wherein the trained AI system is configured to identify a real object corresponding to a label of one or more of the stored labeled identified set of objects in the COT lookup table, wherein the real object is a real-world, target object.

2. The system of claim 1, wherein the synthetic 3D modeling environment scene is defined by a plurality of modeling parameters including the plurality of objects, and is defined by an area of interest, a time of day, a terrain, and a weather condition.

3. The system of claim 1, wherein:
the image data generated synthetically by the in-flight camera simulation includes a distance of the camera from the plurality of objects, an angle, and a field of view (FOV); and
each of the distance of the camera from the plurality of objects, the angle, and the FOV are randomly selected from within a predetermined range.

4. The system of claim 3, wherein the processor is configured to:
apply 3D coordinates of the plurality of objects to the synthetic 3D modeling environment scene, the 3D coordinates determined by the distance of the camera from the plurality of objects, the angle, and the FOV, based on a flight physics model and data received from global positioning system (GPS) and inertial measurement unit (IMU) sensors;
calculate a pixel position of the set of objects based on the applied 3D coordinates of the plurality of objects; and
produce the first mask as an annotation of the set of objects.

5. The system of claim 1, wherein the processor is further configured to:
merge the ordered sequence into an encoded portable network graphics (PNG) annotation.

6. The system of claim 1, wherein, to label the identified set of objects, the processor is configured to read the string in the COT lookup table, beginning with a final character in the COT lookup table, to label the identified object using pre-existing label information.

7. The system of claim 1, wherein the processor is further configured to:
receive real-time image data from the camera;
recognize the real-world, target object in the real-time image data;
compare the real-world, target object to the stored labeled identified set of objects in the database; and
identify the real-world, target object based on the real-world, target object corresponding to the label of the one or more of the stored labeled identified set of objects.

8. The system of claim 1, wherein the processor is configured to produce the first mask by isolating the set of objects in the synthetic 3D modeling environment scene and excluding pixels of the synthetic 3D modeling environment scene from the set of objects.

9. A method for labeling an object, the method comprising:
creating a synthetic three-dimensional (3D) modeling environment scene;
generating image data synthetically by an in-flight camera simulation, the image data being within the synthetic 3D modeling environment scene based on an orientation of a camera and including a plurality of objects;
using a first mask to identify a set of objects of the plurality of objects in the synthetic 3D modeling environment scene;
identifying a second object of the plurality of objects in the image data;
producing a second mask for the second object;
determining an ordered sequence of the first mask and the second mask, wherein each of the first mask and the second mask is a binary mask;
labeling the identified set of objects using a cursor on target (COT) lookup table, wherein, for an identified object of the identified set of objects, a label of the identified object is based on a string in the COT lookup table, and wherein a confidence level of the label is based on a length of the string; and
storing the labeled identified set of objects and flight metadata in a database as part of a training dataset to thereby train an artificial intelligence (AI) system, wherein the trained AI system is configured to identify a real object corresponding to a label of one or more of the stored labeled identified set of objects in the COT lookup table, wherein the real object is a real-world, target object.

10. The method of claim 9, wherein the synthetic 3D modeling environment scene is defined by a plurality of modeling parameters including the plurality of objects and is defined by an area of interest, a time of day, a terrain, and a weather condition.

11. The method of claim 9, wherein:
the image data generated synthetically by the in-flight camera simulation includes a distance of the camera from the plurality of objects, an angle, and a field of view (FOV); and
each of the distance of the camera from the plurality of objects, the angle, and the FOV are randomly selected from within a predetermined range.

12. The method of claim 11, further comprising:
applying 3D coordinates of the plurality of objects to the synthetic 3D modeling environment scene, the 3D coordinates determined by the distance of the in flight camera from the plurality of objects, the angle, and the FOV, based on a flight physics model and data received from global positioning system (GPS) and inertial measurement unit (IMU) sensors;
calculating a pixel position of the set of objects based on the applied 3D coordinates of the plurality of objects; and
producing the first mask as an annotation of the set of objects.

13. The method of claim 9, further comprising:
merging the ordered sequence into an encoded portable network graphics (PNG) annotation.

14. The method of claim 9, wherein labeling the identified set of objects comprises reading the string in the COT lookup table, beginning with a final character in the COT lookup table, to label the identified object using pre-existing label information.

15. The method of claim 9, further comprising:
receiving real-time image data from the camera;
recognizing the real-world, target object in the real-time image data;
comparing the real-world, target object to the stored labeled identified set of objects in the database; and
identifying the real-world, target object based on the real-world, target object corresponding to the label of the one or more of the stored labeled identified set of objects.

16. The method of claim 9, wherein producing the first mask comprises isolating the set of objects in the synthetic 3D modeling environment scene and excluding pixels of the synthetic 3D modeling environment scene from the set of objects.

17. A computer program product, comprising a non-transitory computer usable medium having a computer readable program code embodied therein, the computer readable program code adapted to be executed, to label an object, to:
create a synthetic three-dimensional (3D) modeling environment scene;
generate image data synthetically by an in-flight camera simulation, the image data being within the synthetic 3D modeling environment scene based on an orientation of a camera and including a plurality of objects;
use a first mask to identify a set of objects of the plurality of objects in the synthetic 3D modeling environment scene;
identify a second object of the plurality of objects in the image data;
produce a second mask for the second object;
determine an ordered sequence of the first mask and the second mask, wherein each of the first mask and the second mask is a binary mask;
label the identified set of objects using a cursor on target (COT) lookup table, wherein, for an identified object of the identified set of objects, a label of the identified object is based on a string in the COT lookup table, and wherein a confidence level of the label is based on a length of the string; and
store the labeled identified set of objects and flight metadata in a database as part of a training dataset to thereby train an artificial intelligence (AI) system, wherein the trained AI system is configured to identify a real object corresponding to a label of one or more of the stored labeled identified set of objects in the COT lookup table, wherein the real object is a real-world, target object.

18. The computer program product of claim 17, wherein:
the image data synthetically generated by the in-flight camera simulation includes a distance of the camera from the plurality of objects, an angle, and a field of view (FOV);
each of the distance of the camera from the plurality of objects, the angle, and the FOV are randomly selected from within a predetermined range; and
the computer readable program code is further adapted to:
apply 3D coordinates of the plurality of objects to the synthetic 3D modeling environment scene, the 3D coordinates determined by the distance of the camera from the plurality of objects, the angle, and the FOV, based on a flight physics model and data received from global positioning system (GPS) and inertial measurement unit (IMU) sensors;
calculate a pixel position of the set of objects based on the applied 3D coordinates of the plurality of objects;
produce the first mask as an annotation of the set of objects; and
merge the ordered sequence into an encoded portable network graphics (PNG) annotation.

19. The computer program product of claim 17, wherein the computer readable program code is further adapted to read the string in the COT lookup table, beginning with a final character in the COT lookup table, to label one or more of the identified object using pre-existing label information.

20. The computer program product of claim 17, wherein the computer readable program code is further adapted to:
receive real-time image data from the camera,
recognize the real-world, target object in the real-time image data,
compare the real-world, target object to the stored labeled identified set of objects in the database, and
identify the real-world, target object based on the real-world, target object corresponding to the label of the one or more of the stored labeled identified set of objects.

21. A system for labeling an object, the system comprising:
a processor configured to execute instructions stored on a memory; and
the memory storing computer-readable instructions that, when executed by the processor, causes the processor to:
create a synthetic three-dimensional (3D) modeling environment scene;
generate image data synthetically by an in-flight camera simulation, the image data being within the synthetic 3D modeling environment scene based on an orientation of a camera and including one or more objects;

use a mask to identify an object of the one or more objects in the synthetic 3D modeling environment scene;

read a string in a cursor on target (COT) lookup table, beginning with a final character in the COT lookup table, to label the identified object using pre-existing label information, wherein a confidence level of the label is based on a length of the string; and store the labeled identified object and flight metadata in a database as part of a training dataset to thereby train an artificial intelligence (AI) system, wherein the trained AI system is configured to identify a real object corresponding to a label of the stored labeled identified object in the COT lookup table, wherein the real object is a real-world, target object.

22. The system of claim 21, wherein:

the synthetic 3D modeling environment scene is defined by a plurality of modeling parameters including the one or more objects, and is defined by an area of interest, a time of day, a terrain, and a weather condition;

the image data generated synthetically by the in-flight camera simulation includes a distance of the camera from the one or more objects, an angle, and a field of view (FOV); and each of the distance of the camera from the one or more objects, the angle, and the FOV are randomly selected from within a predetermined range.

23. The system of claim 22, wherein the processor is configured to:

apply 3D coordinates of the one or more objects to the synthetic 3D modeling environment scene, the 3D coordinates determined by the distance of the in flight camera from the one or more objects, the angle, and the FOV, based on a flight physics model and data received from global positioning system (GPS) and inertial measurement unit (IMU) sensors;

calculate a pixel position of the one or more objects based on the applied 3D coordinates of the one or more objects; and produce the mask as an annotation of the one or more objects.

24. The system of claim 21, wherein the processor is configured to produce the mask by isolating the one or more objects in the synthetic 3D modeling environment scene and excluding pixels of the synthetic 3D modeling environment scene from the one or more objects.

25. A method for labeling an object, the method comprising:

creating a synthetic three-dimensional (3D) modeling environment scene;

generating image data synthetically by an in-flight camera simulation, the image data being within the synthetic 3D modeling environment scene based on an orientation of a camera and including one or more objects;

using a mask to identify an object of the one or more objects in the synthetic 3D modeling environment scene;

reading a string in a cursor on target (COT) lookup table, beginning with a final character in the COT lookup table, to label the identified object using pre-existing label information, wherein a confidence level of the label is based on a length of the string; and storing the labeled identified object and flight metadata in a database as part of a training dataset to thereby train an artificial intelligence (AI) system, wherein the trained AI system is configured to identify a real object corresponding to a label of the stored labeled identified object in the COT lookup table, wherein the real object is a real-world, target object.

26. The method of claim 25, wherein:

the synthetic 3D modeling environment scene is defined by a plurality of modeling parameters including the one or more objects, and is defined by an area of interest, a time of day, a terrain, and a weather condition;

the image data generated synthetically by the in-flight camera simulation includes a distance of the camera from the one or more objects, an angle, and a field of view (FOV); and each of the distance of the in flight camera from the one or more objects, the angle, and the FOV are randomly selected from within a predetermined range.

27. The method of claim 26, further comprising:

applying 3D coordinates of the one or more objects to the synthetic 3D modeling environment scene, the 3D coordinates determined by the distance of the camera from the one or more objects, the angle, and the FOV, based on a flight physics model and data received from global positioning system (GPS) and inertial measurement unit (IMU) sensors;

calculating a pixel position of the one or more objects based on the applied 3D coordinates of the one or more objects; and producing the mask as an annotation of the one or more objects.

28. The method of claim 25, wherein producing the mask comprises isolating the one or more objects in the synthetic 3D modeling environment scene and excluding pixels of the synthetic 3D modeling environment scene from the one or more objects.

29. A computer program product, comprising a non-transitory computer usable medium having a computer readable program code embodied therein, the computer readable program code adapted to be executed to:

create a synthetic three-dimensional (3D) modeling environment scene;

generate image data synthetically by an in-flight camera simulation, the image data being within the synthetic 3D modeling environment scene based on an orientation of a camera and including one or more objects;

use a mask to identify an object of the one or more objects in the synthetic 3D modeling environment scene;

read a string in a cursor on target (COT) lookup table, beginning with a final character in the COT lookup table, to label the identified object using pre-existing label information, wherein a confidence level of the label is based on a length of the string; and store the labeled identified object and flight metadata in a database as part of a training dataset to thereby train an artificial intelligence (AI) system, wherein the trained AI system is configured to identify a real object corresponding to a label of the stored labeled identified object in the COT lookup table, wherein the real object is a real-world, target object.

30. The computer program product of claim 29, wherein:

the synthetic 3D modeling environment scene is defined by a plurality of modeling parameters including the one or more objects, and is defined by an area of interest, a time of day, a terrain, and a weather condition;

the image data generated synthetically by the in-flight camera simulation includes a distance of the camera from the one or more objects, an angle, and a field of view (FOV); and each of the distance of the camera from the one or more objects, the angle, and the FOV are randomly selected from within a predetermined range.

31. The computer program product of claim 30, wherein the computer readable program code is further adapted to:
apply 3D coordinates of the one or more objects to the synthetic 3D modeling environment scene, the 3D coordinates determined by the distance of the in flight camera from the one or more objects, the angle, and the FOV, based on a flight physics model and data received from global positioning system (GPS) and inertial measurement unit (IMU) sensors;
calculate a pixel position of the one or more objects based on the applied 3D coordinates of the one or more objects; and
produce the mask as an annotation of the one or more objects.

32. The computer program product of claim 29, wherein the computer readable program code is adapted to produce the mask by isolating the one or more objects in the synthetic 3D modeling environment scene and excluding pixels of the synthetic 3D modeling environment scene from the one or more objects.

* * * * *

UNITED STATES PATENT AND TRADEMARK OFFICE
CERTIFICATE OF CORRECTION

PATENT NO. : 12,347,188 B2
APPLICATION NO. : 17/517594
DATED : July 1, 2025
INVENTOR(S) : Yan Yang et al.

Page 1 of 1

It is certified that error appears in the above-identified patent and that said Letters Patent is hereby corrected as shown below:

In the Claims

Claim 12:
Column 23, Line 16 change "...by the distance of the in flight camera..." to --...by the distance of the camera...--

Claim 19:
Column 24, Line 41 change "...to label one or more of the identified object..." to --...to label the identified object...

Claim 23:
Column 25, Line 32 change "...by the distance of the in flight camera..." to --...by the distance of the camera...--

Claim 26:
Column 26, Line 12 change "...each of the distance of the in flight camera..." to --...each of the distance of the camera...--

Claim 31:
Column 27, Line 8 change "...by the disance of the in flight camera..." to --...by the distance of the camera...--

Signed and Sealed this
Seventh Day of October, 2025

John A. Squires
*Director of the United States Patent and Trademark Office*